C. M. LYNN.
CHILD'S VEHICLE.
APPLICATION FILED APR. 18, 1917.

1,233,077.

Patented July 10, 1917.

INVENTOR
Clarence M. Lynn
BY John A. Nasmith
HIS ATTORNEY

UNITED STATES PATENT OFFICE.

CLARENCE M. LYNN, OF SAN JOSE, CALIFORNIA.

CHILD'S VEHICLE.

1,233,077.  Specification of Letters Patent.  Patented July 10, 1917.

Application filed April 18, 1917. Serial No. 163,009.

*To all whom it may concern:*

Be it known that I, CLARENCE M. LYNN, a citizen of the United States, and residing near San Jose, in the county of Santa Clara and State of California, have invented certain new and useful Improvements in Children's Vehicles, of which the following is a specification.

My invention relates to a new and novel form of child's vehicle, and the objects of my invention are to provide a vehicle of the character indicated that is operated by a simple form of manually operated driving mechanism; that will be somewhat difficult to overturn; that permits free play of the child's feet in mounting and dismounting from the vehicle, and when the same is used as a velocipede.

Other objects are to provide a device of the character indicated that will be economical to manufacture, serviceable, and efficient.

In the drawings:—

Similar characters of reference refer to similar parts throughout the several views.

Figure 1:
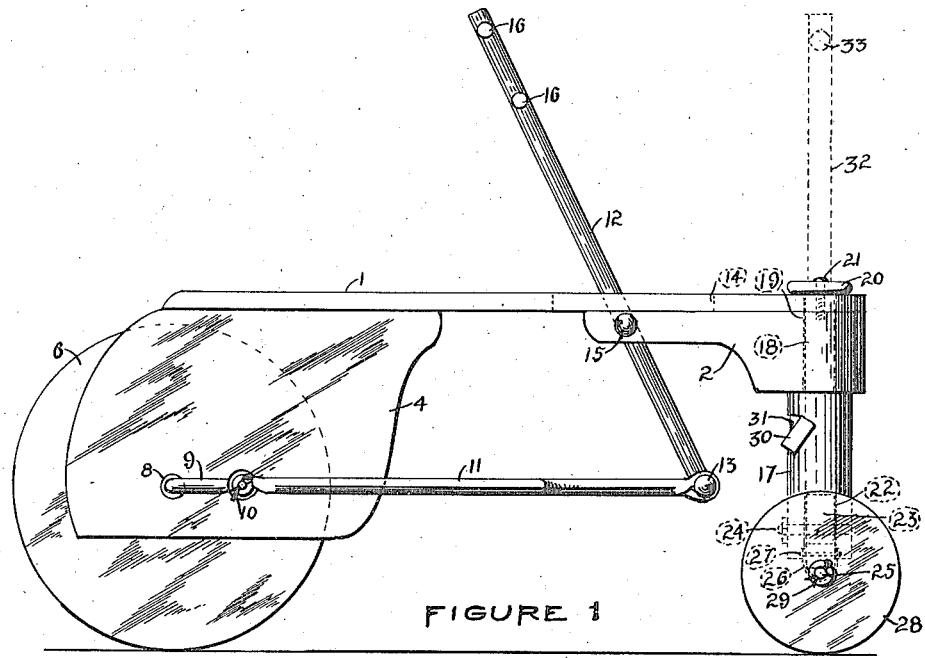
Figure 1 is a side elevation of my improved child's vehicle.
Figure 2:
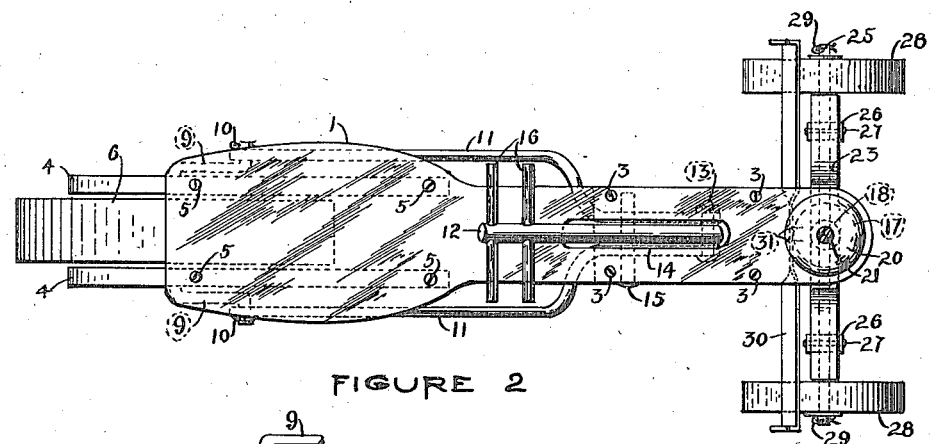
Fig. 2 is a plan view of the same.
Figure 3:
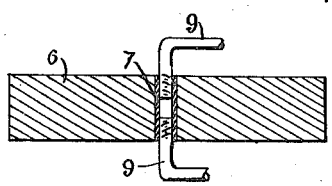
Fig. 3 is a sectional view through the axis of the rear wheel.

At 1 is shown an elongated seat member having a solid bearing member 2 secured to its forward under side by screws 3, and a pair of side bearing members 4 secured to the under surface of its rear portion by screws 5 as shown. At 6 is shown the rear traction wheel which is mounted in members 4 in the following manner. An interiorly threaded sleeve 7 is fitted tightly into axis of wheel 6 and metallic bearings 8 are inserted in the desired position in members 4. Cranks 9 are now formed as shown and threaded on one end, the threaded end being passed through bearings 8 and screwed into sleeve 7. The outer ends of cranks 9 are bent outwardly and fitted with cotter pins 10. Connecting rods 11 are bent around the ends of cranks 9 and held in place by cotter pins 10 and pass forwardly where they are bent toward each other and then joined to the lower end of operating bar 12 by a bolt 13 passing therethrough. Bar 12 passes upwardly through slot 14 formed in seat member 1 and is pivoted on bolt 15 inserted in member 2. The upper portion of bar 12 is fitted with handles as 16. A vertically positioned member is shown at 17 having a shaft 18 formed upon its upper end and engaging bearing 19 in members 1 and 2 and held in place by button 20 and screw 21. The lower end of member 17 has a slot 22 formed therein in which is secured shaft 23 by bolt 24. Shaft 23 has an axle 25 secured to its lower edge by bands 26 and bolt 27, said axle 25 projecting a distance beyond each end of shaft 23 and having wheels 28 mounted thereon and held in place by cotter pins 29. A foot bar 30 is shown secured to member 17 by screws 31 and arranged substantially parallel to shaft 23 as shown. The device is driven by the manual operation of bar 12 and the parts connected thereto, and steered with the feet operating against foot bar 30.

This device may be changed to a foot propelled vehicle by removing the manually operating mechanism above described and prolonging axle 18 as shown in dotted lines at 32, and affixing a handle bar 33 to the upper portion of said prolonged axle 32.

I claim:—

A child's vehicle comprising a seat board adapted to be straddled, a single traction wheel supporting the rear portion thereof, a single centrally mounted propelling means operatively connected to said traction wheel, and steering wheels supporting the forward end of said seat board.

In testimony whereof I have hereunto affixed my signature this 9th day of April, 1917, at San Jose, Santa Clara county, California.

CLARENCE M. LYNN.